March 10, 1936.  C. PACK  2,033,735
MOLDING APPARATUS
Filed July 13, 1933   3 Sheets-Sheet 1
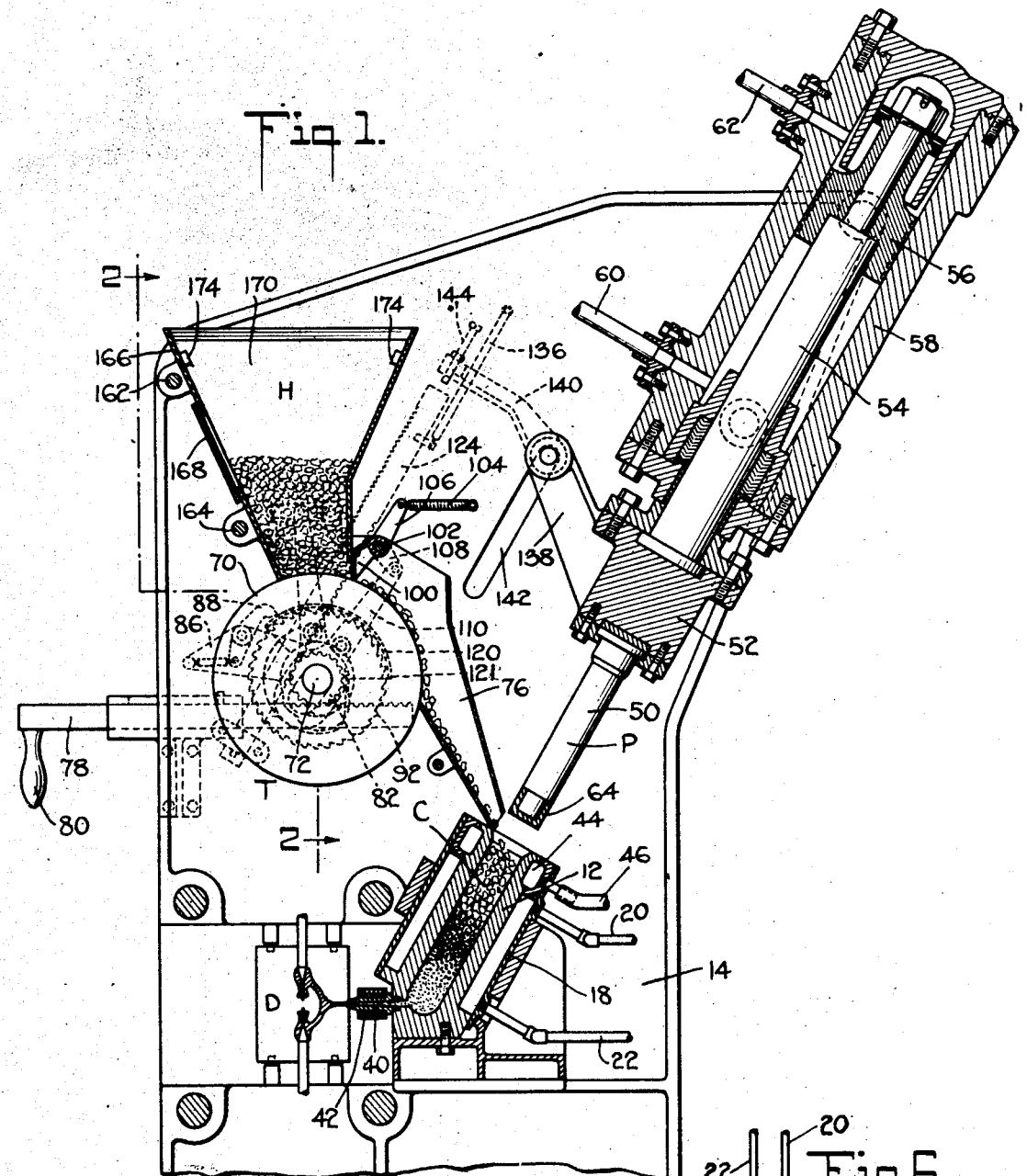
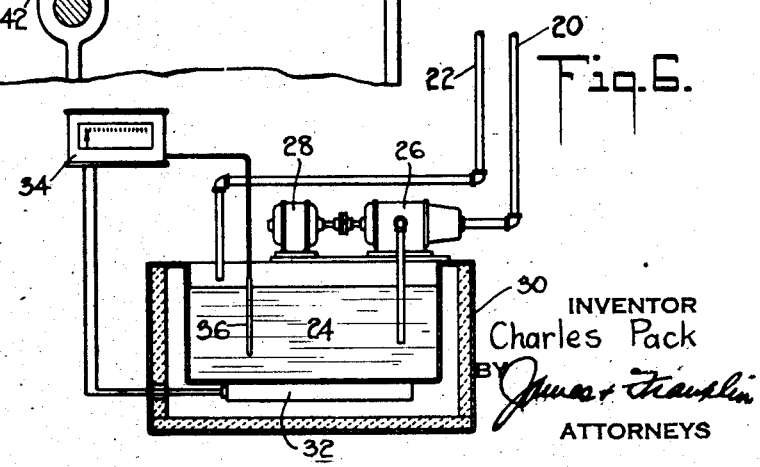
INVENTOR
Charles Pack
BY
ATTORNEYS

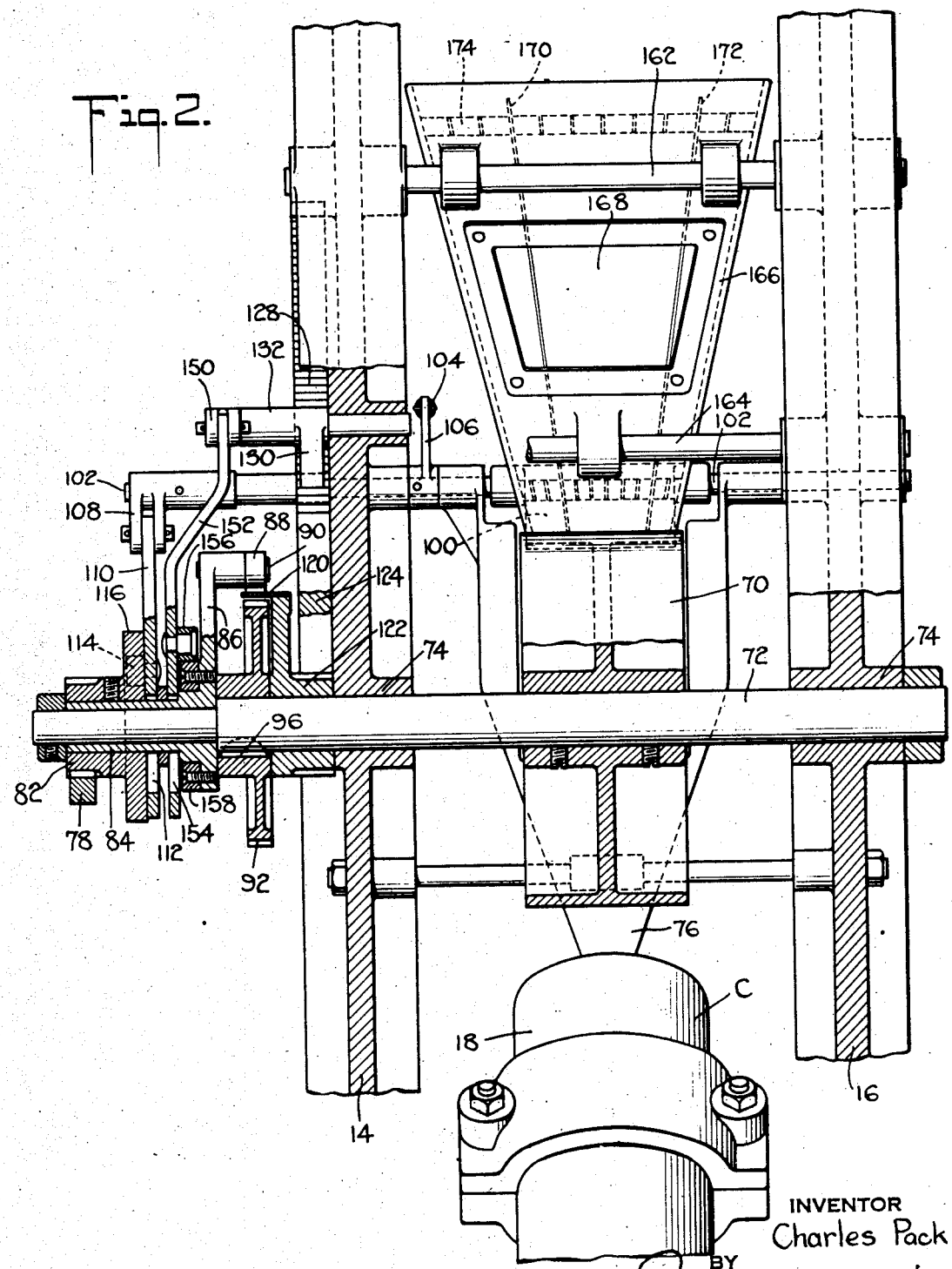

March 10, 1936.  C. PACK  2,033,735
MOLDING APPARATUS
Filed July 13, 1933  3 Sheets-Sheet 3
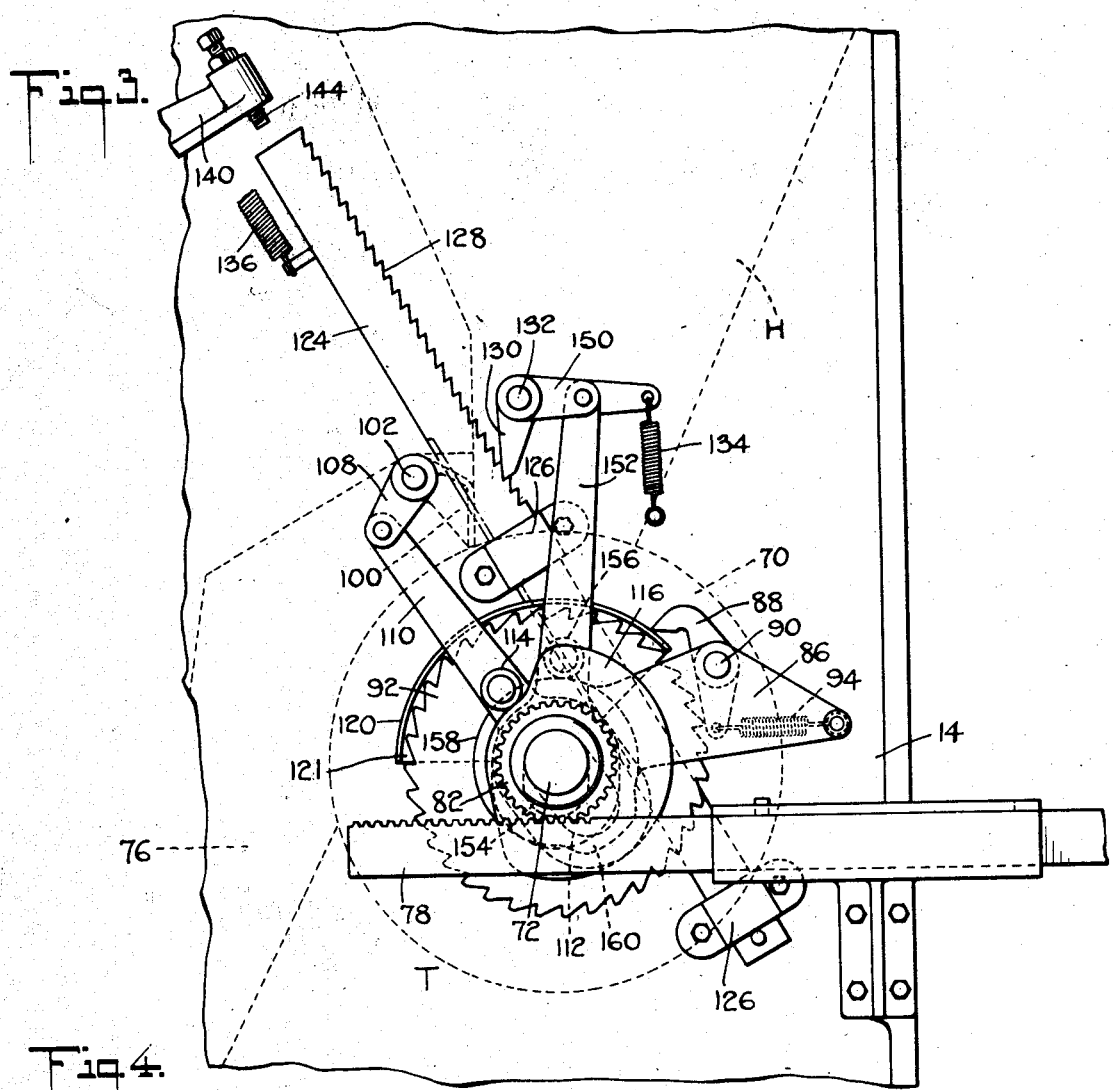
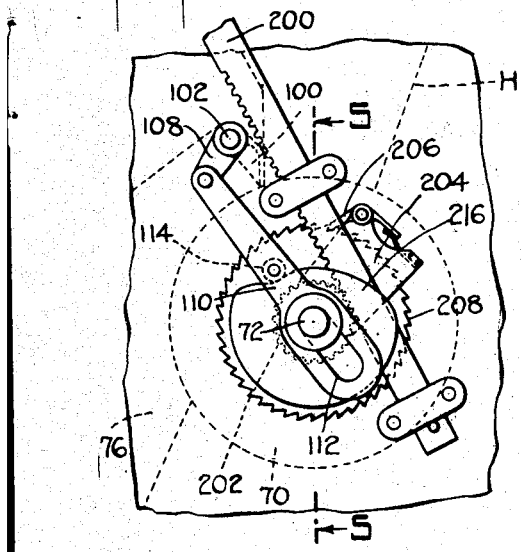
INVENTOR
Charles Pack
BY
ATTORNEYS Patented Mar. 10, 1936

2,033,735

UNITED STATES PATENT OFFICE 2,033,735

MOLDING APPARATUS

Charles Pack, Forest Hills, N. Y., assignor, by mesne assignments, to Tennessee Eastman Corporation, Kingsport, Tenn., a corporation of Virginia Application July 13, 1933, Serial No. 680,211

16 Claims. (Cl. 18—5)

This invention relates to the molding of plastics, and more particularly to molding apparatus for molding articles under pressure out of cellulose acetate or similar plastics.

The possibility of molding articles under pressure out of thermoplastic material, such as cellulose acetate, has been suggested for some time, but the practical accomplishment of useful molding of this material under high pressure presents many difficulties which have heretofore limited this field of molding. The primary and general object of the present invention resides in the provision of improved molding apparatus which will make it possible to mold cellulose acetate and other thermoplastic materials under high pressure with uniformly good results and reasonably rapid operation, and without necessitating skilled attention.

More particular objects of the present invention center about the feed of molding material to a heating and extrusion chamber in which the material is fused and forced under high pressure into a mold or die proper. One such object resides in the provision of a relatively large hopper loaded with the molding material, together with appropriate means for transferring some of the molding material to the extrusion cylinder. Another object is to provide means for smoothly and uniformly feeding the bottom-most layer of material from the hopper to the cylinder. Still another object of my invention is to automatically measure or determine the amount of material fed from the hopper to the cylinder to be commensurate with the rate of delivery of material from the cylinder. More specifically I provide means dependent upon the stroke of the plunger moved into the extrusion cylinder for determining the amount of molding material next fed to the cylinder, thereby compensating for inequalities in the comminution and compressibility of the material, and maintaining a substantially constant amount of material in the cylinder. In accordance with still another object of my invention the transfer of material from the hopper to the cylinder may be accomplished manually after the plunger has been completely retracted from the cylinder, and yet the amount of feed need not be gauged by the operator, it having been automatically predetermined by mechanism associated with and responsive to the preceding movement of the plunger.

The molding material is somewhat abrasive in effect, particularly when compressed to pressures of the order of 100,000 pounds per square inch, as are contemplated in the present apparatus. Under high pressure the molding material tends to wedge between the plunger and cylinder and develops a relatively great abrasive effect, and, even if the plunger and cylinder are made of heat treated steel, they are short-lived. A further object of my invention is to overcome this difficulty, and with this object in view I provide the end of the hardened plunger with a tip or cap made of a relatively soft metal such as copper or german silver. Such a tip tends to expand or mushroom under high pressure and forms a very effective seal between the plunger and cylinder. At the same time no destructive wear of the cylinder takes place, while wear on the plunger tip is remedied by occasional replacement of the soft metal cap.

I have found that the molding material is rather sensitive and critical as to proper temperature. If insufficiently heated it will not flow and blend properly. If excessively heated it tends to oxidize. Accordingly, a further object of my invention is to maintain constant and uniform temperature heating of the molding material. With this object in view I jacket the heating and extrusion cylinder with an oil jacket and constantly circulate therethrough a bath of heated oil which in turn is arranged for automatic temperature control so as to prevent variations in temperature. Furthermore, the cellulose acetate material is not a good heat conductor, and it is therefore difficult to maintain a uniform temperature and plasticity throughout the mass of material in the cylinder. To insure uniform treatment of the material before it enters the mold I preferably interconnect the cylinder and mold with a relatively slender elongated nozzle in which the molding material is constricted and attenuated. I further provide this nozzle with additional heating means which may conveniently take the form of an electrical heating coil adapted to maintain the nozzle at a constant temperature. The material is therefore heated in attenuated condition just before entering the mold, thus insuring uniform treatment.

A still further object of the present invention is to minimize any tendency of the molding material to back-flow around the plunger, and to secure this object the cylinder is jacketed for different temperature zones, the zone near the entrant end of the cylinder being chilled with cooling water. This construction keeps the uppermost portion of the molding material in solid condition, and it is only further down the cylinder that the material becomes truly plastic.

One reason for the desirability of articles molded from cellulose acetate is the beautiful color effects which may be obtained with this material. Some additional objects of my invention center about the mixing or blending of different-colored materials to obtain desired color effects, and are to make possible such mixture of material without requiring a separate mixing operation, and, further, to make it possible to vary the proportions or percentages of the different colors used as well as the number of colors which may be handled by the machine.

To the accomplishment of the foregoing and such other objects as will hereinafter appear, my invention consists in the molding apparatus elements and their relation one to the other as hereinafter are more particularly described in the specification and sought to be defined in the claims. The specification is accompanied by drawings in which:

Fig. 1 is a section taken in elevation through a machine embodying features of my invention;

Fig. 2 is an enlarged section taken in the plane of the line 2—2 of Fig. 1;

Fig. 3 is an enlarged detail of the feed mechanism;

Fig. 4 is a similar view of a modification;

Fig. 5 is a section taken in the plane of the line 5—5 of Fig. 4; and

Fig. 6 shows the oil temperature regulating means of the apparatus.

Referring to the drawings and more particularly to Fig. 1 thereof, the apparatus comprises a mold or die D, a heating and extrusion cylinder C in flow communication therewith, and a plunger P movable into and out of the cylinder C. The cylinder is supplied with molding material from a bin or hopper H, the molding material being transferred from the hopper to the cylinder by transfer mechanism designated generally by the letter T. It will be evident that downward movement of plunger P compresses the heated material in cylinder C and extrudes the same into the die D until the mold impressions therein have been filled. The plunger may then be retracted, the die opened, and the molded articles removed therefrom. In the meantime and subsequent to retraction of plunger P, a preferably measured charge of molding material is transferred by the mechanism T from hopper H to cylinder C.

Considering the apparatus in greater detail, the die D may be of conventional type consisting of a cover half and an ejector half, the cover half preferably being secured rigidly to one side of the machine frame, and the ejector half being movable toward and from the cover half by appropriate hydraulic piston and cylinder mechanism. The details of the die and die opening and closing mechanism form no part of the present invention and need not be described in detail.

The cylinder C comprises a chamber 12 made of heat treated steel and suitably mounted between the side walls or frame members 14 and 16. The cylinder is provided with heating means here exemplified by a jacket 18 provided with inlet and outlet pipes 20 and 22 for hot oil. The oil is heated in a suitable bath 24 from which it is circulated through the cylinder jacket by a centrifugal pump 26 driven by a motor 28. The oil bath 24 is housed in a heat insulating furnace or chamber 30 and is heated by appropriate electrical resistance heating elements 32. The temperature of the oil is automatically controlled by pyrometric temperature control means indicated at 34, this means serving to control the heating of resistance unit 32 in response to changes in temperature applied to the pyrod 36 immersed in the oil bath 24. It will be seen that by maintaining the oil bath at a constant temperature and by continually circulating the oil through the cylinder jacket, the cylinder may itself be kept at a constant temperature. The preferred temperature depends to some extent upon the particular grade and mixture of material being molded, but for ordinary purposes a temperature of 240° F. is desirable when operating upon cellulose acetate. The maintenance of a constant uniform temperature is essential for uniform molding results.

The cylinder C and mold D are interconnected by a relatively elongated constricted nozzle 40 which is attached to and forms a part of the extrusion cylinder. This nozzle is preferably provided with heating means because the molding material is a relatively poor conductor of heat and is therefore best heated when in attenuated condition. Uniform temperature conditions may be established across the small section of material in nozzle 40, whereas it is difficult to accomplish this in the relatively larger section of material in cylinder C. In the present case nozzle 40 is surrounded by an electrical heating unit 42, this unit being so dimensioned as to maintain the nozzle at the desired constant temperature once the machine has been warmed up. In the specific case already mentioned the unit 42 is designed to keep the nozzle at a temperature of 240° F. corresponding to the temperature maintained in the extrusion cylinder. It will be understood, of course, that the electrical heating means 42 may, if desired, be replaced by an oil jacket heated by oil supplied from the bath 24, as heretofore described.

The uppermost portion of cylinder C is preferably jacketed separately from the main body of the cylinder, thereby providing a jacket 44 which is used as a cooling jacket, this being supplied with cold water through appropriate piping 46. The chilling of the topmost zone of the cylinder is desirable in order to discourage any attempt at back-flow of the molding material around the plunger. The arrangement shown permits the uppermost layer of material to remain in solid condition, and it is only the lower portions of material that are in a fused or molten state. This condition is roughly indicated by the gradations in size of the pieces of molding material shown in the drawings. It will be understood, however, that the material need not be fed to the cylinder in the form of relatively large lumps, but may instead be granular or more finely comminuted.

In actual practice relatively large pieces of molding material may be fed to the cylinder because of a desire to produce a variegated color effect. For this purpose laminations of different-colored material may be preliminarily secured together, and the resulting sheet may be diced, thus forming lumps of multiple-colored material. This material may be fed alone to the cylinder or may be mixed with a considerable quantity of uniformly colored and relatively finely comminuted material, the larger pieces serving primarily to produce a streaked or variegated color effect in a different-colored background.

The plunger P consists of a heat treated steel cylinder 50 mounted upon and moved by a cross head 52 which in turn is reciprocated by a piston rod 54 and piston 56 reciprocable in hydraulic cylinder 58 mounted between the frame members 14 and 16. The cylinder 58 is supplied with oil under pressure through pipes 60 and 62, the flow of oil being regulated by appropriate valve mechanism, not shown, designed to exhaust or open one of the pipes when supplying the other pipe with high pressure liquid. By movement of the valve in one direction the plunger may be forced into the cylinder, while movement of the valve in the opposite direction will cause retraction of the plunger from the cylinder.

To prevent excessive abrasion and wear of the plunger and cylinder, and to provide a perfect leak-proof seal between the plunger and cylinder despite the high molding pressure employed, I provide the hardened plunger with a relatively soft metal tip or cap 64. The molding pressure may be of the order of 100,000 pounds per square inch, and under this extremely high pressure the cellulose acetate tends to wedge between the plunger and cylinder and may result in serious scoring of the working parts of the machine even though cellulose acetate is ordinarily considered to be a non-abrasive material. With the relatively soft mushroom end or tip for the plunger this difficulty is entirely overcome, for under high pressure the soft end tends to expand or mushroom outwardly and forms an effective and perfect seal between the plunger and cylinder. The soft nature of the tip prevents scoring of the cylinder. Wear of the cap is itself not serious because this cap may be replaced when necessary. The cap is made of an appropriate soft metal such as copper, german silver, or other nickel alloy.

The mechanism for replenishing the supply of molding material in cylinder C will next be described. This mechanism comprises a hopper or storage bin H and transfer mechanism T for delivering small measured quantities of the molding material from the hopper to the cylinder. The hopper consists of side walls only, the top being left open to permit a supply of the molding material to be dumped therein, and the bottom being closed by a movable surface consisting of the periphery of a drum or cylinder 70. The drum 70 is mounted on a shaft 72 journaled in bearings 74 formed in the side walls 14 and 16 of the machine frame. The drum is preferably rotated intermittently and uni-directionally in order to move material from the drum to a chute 76 leading to the upper end of the cylinder. While the desired movement of the drum may be obtained automatically as will be subsequently described, it is preferably obtained by manual means here exemplified by a pull rod or rack bar 78 having a handle 80. As is best shown in Figs. 2 and 3 of the drawings the rack bar 78 meshes with a pinion 82 which in turn is secured through a sleeve 84 to an oscillatable pawl plate 86. This plate carries a pawl 88 pivoted at 90 on plate 86 and normally urged into engagement with the teeth of ratchet wheel 92 by a spring 94. Ratchet wheel 92 is keyed at 96 to the drum shaft 72. It will thus be evident that when rack 78 is pulled outwardly by the machine operator, the drum 70 is rotated counter-clockwise as viewed in Fig. 3, or clockwise as viewed in Fig. 1, thereby tending to deliver the bottommost material from the hopper to the chute 76 and thence to the extrusion cylinder. Upon inward movement of the rack bar 78 the drum remains stationary because of the slippage afforded between the pawl 88 and ratchet wheel 92.

The hopper is preferably provided with a door 100 located at the bottom leading edge of the hopper and operating when closed to prevent discharge of material therefrom. The door 100 is pivoted on a shaft 102 extending between and journaled in the side frame members 14 and 16. The door is normally held in closed condition by a spring 104 the tension of which is applied to an arm 106 extending upwardly from the door shaft 102.

The outer extremity of door shaft 102 is provided with appropriate mechanism for opening the door at the beginning of the feeding operation. For this purpose the shaft is provided with an arm 108 actuated by a connecting rod 110 the lower end of which is slotted at 112 and supported by sleeve 84, the slot permitting longitudinal movement of the connecting rod. The connecting rod is further provided with a cam follower roller 114 which bears against the surface of a cam 116 formed integrally with pinion 82. As will be apparent from inspection of Fig. 3, when the manually operated rack bar 78 is in innermost position, the cam follower roller 114 is depressed, and door 100 is closed. When rack bar 78 is pulled outwardly the resulting counter-clockwise rotation of the pinion and cam causes a prompt elevation of the cam follower and opening of door 100. Inasmuch as nearly all of the remaining periphery of the cam is of uniform large radius, the door is held open during the entire outward or feed movement of the rack bar. When the rack bar is restored to its innermost position the door is again closed, as shown in Fig. 3.

As so far described the feed of material from the hopper to the cylinder is obtained by manual manipulation of rack bar 78, and the amount of feed is dependent upon the extent of movement of the rack bar. Such an arrangement requires extreme watchfulness and care on the part of the operator, for otherwise the supply of material to the cylinder may cumulatively increase or decrease with injurious consequences. In accordance with a further feature of the present invention the rack bar 78 may be pulled through its entire extent of movement, but the amount of feed of material to the cylinder is automatically regulated in accordance with the requirements of the machine. For this purpose there is interposed between the drum ratchet 92 and the operating pawl 88 a guard or shroud 120 which makes the movement of pawl 88 ineffective until after the pawl has passed the end 121 of the shroud. The shroud 120 is mounted on a pinion 122 which meshes with a sloping rack bar 124, this rack bar being slidable in guides 126 secured on the outer side of frame member 14. The upper portion of the rack bar is provided with teeth 128 adapted for engagement by a holding dog 130 pivoted at 132. The dog 130 is normally held in engagement with the rack bar by a spring 134.

The sloping rack bar 124 is normally held in the upward position shown in Figs. 1 and 3 by a spring 136. It is arranged to be moved downwardly by movement of the plunger P, and for this purpose the cross head 52 is provided with an arm 138 having an extension 140 which passes through a slot 142 in the frame of the machine. The arm 140 carries an adjustable screw stop 144 disposed in alignment with the end of the sloping rack bar 124.

It will thus be evident that upon downward movement of the plunger the sloping rack bar 124 is moved downwardly an amount dependent upon the stroke of the plunger. This downward movement of the rack bar is accompanied by rotation of pinion 122 and similar movement of shroud 120. As viewed in Fig. 3, downward movement of sloping rack bar 124 causes clockwise movement of the shroud and consequently uncovers or makes effective a greater number of teeth on ratchet 92. The rack bar is held in its downward position by dog 130, and consequently the shroud 120 is held in a fixed position dependent upon the stroke of the plunger during the preceding molding operation. When the manually operable rack bar 78 is pulled outwardly, pawl 88 slides in shroud 120 until it reaches the end 121 of the shroud, after which it rotates the ratchet wheel and the drum. The feed of material from the hopper is proportional to the rotation of the drum which in turn depends upon the position of the shroud, and this in turn depends upon the preceding plunger movement. Even when molding the same article in a single die the plunger movement may differ from time to time due to a difference in compressibility of the material in the cylinder, for this in turn varies with factors such as the granular fineness of the material and the nature of the plasticizer employed. Such variations are of no consequence with the present apparatus for when once adjusted the supply of material is so regulated as to compensate for changes in movement of the plunger. Rapid cumulative error in one direction or the other is thereby effectually prevented.

When the outward or feed movement of manually operated rack bar 78 has been practically completed, it is no longer necessary to hold the shroud 120 in position, and at this time the dog 130 is released and the sloping rack bar 124 is drawn upwardly to initial position by the restoring spring 136. To release dog 130 the pintle 132 is provided with an arm 150 actuated by a connecting rod 152. The lower end of the connecting rod is slotted at 154 and carried by sleeve 84, the slot 154 affording vertical movement of the connecting rod. The connecting rod carries a cam follower roller 156 which cooperates with a cam 158 secured to the sleeve 84 and to the pawl plate 86. The cam 158 is provided with a lift 160 so located as to engage the cam follower 156 when the rack bar 78 has been pulled to its outermost position.

The hopper H is mounted between the frame members 14 and 16 by appropriate supporting rods 162 and 164. The front wall 166 of the hopper may be provided with a sight window 168, thereby permitting the operator to tell at a glance the level of molding material remaining in the hopper. The hopper may be additionally provided with one or more partitions 170 and 172 which are removably inserted in the hopper. These partition preferably extend downwardly to the periphery of the feed drum 70. They are supported by suitable means permitting the partitions to be placed or relatively spaced as desired in the hopper. In the present case the inner walls of the hopper are provided with slotted bars 174 the slots in which are adapted to receive and support the relatively thin sheet-like partitions 170 and 172. With this construction different colors or different kinds of material may be inserted in the hopper and proportioned as desired when feeding the same to the extrusion cylinder. The proportioning of material established by the location of the partitions will be maintained when feeding the material with the aid of the drum, for this same proportion exists on the surface of the drum, and the direction of feed of the drum is, of course, in the same direction as the partitions in the hopper.

The feed movement of the drum may be obtained manually as already described, and this arrangement is desirable because it permits the operator to feed material to the extrusion cylinder after the plunger has been retracted completely from the cylinder. Because of the relatively substantial time needed to chill the cellulose acetate material after it has entered the mold, the apparatus cannot be used at extremely high speed. There is consequently ample time for the operator to manipulate the feed handle at the end of the molding operation. However, the feed may, if desired, be accomplished entirely automatically, and the automatic feed, like the manual feed already described may be and preferably is proportioned to the rate of use of material by the machine. Here again the rate of use may be gauged by the length of the preceding stroke of the plunger.

Referring to Figs. 4 and 5, modified feed apparatus is shown which, for the sake of simplicity, has been made somewhat like the mechanism heretofore described. In the present case, however, the manually operated rack bar is entirely omitted and the feed pawl is operated directly by the sloping rack bar. Specifically, there is a sloping rack bar 200 meshing with a pinion 202 which in turn carries a pawl plate 204 having a pawl 206 meshing with a ratchet wheel 208. Ratchet wheel 208 is keyed at 210 to the drum shaft 72 carrying the feed drum 70. It will be understood that upon downward movement of the rack bar, corresponding to downward movement of the plunger, the pawl is moved backwardly or counter-clockwise over the ratchet teeth, but that upon upward movement of the rack bar, which movement follows upward movement of the plunger, the ratchet wheel is rotated by the pawl and consequently causes feed of material from the drum. Because the movement of the rack bar is dependent upon the movement of the plunger, the feed is likewise dependent upon the preceding movement of the plunger.

The door 100 of the hopper may be operated by mechanism similar to that already described, the door being pivoted on a shaft 102 provided with an arm 188 operated by a connecting rod 110 slotted at 112 and carrying a cam follower roller 114. The cam follower roller engages a cam 216 corresponding to cam 116 in Fig. 3 but oppositely directed and serving to open the door during the downward and upward movement of the rack bar 200. At the end of the feed movement, however, the door 100 is closed, as shown in Fig. 4, and remains closed throughout the remainder of the molding cycle.

A word of explanation about the angular arrangement of the press may not be amiss. The heating and extrusion cylinder is preferably generally upright in nature in order to facilitate refilling the same with additional molding material. The discharge of extruded material is preferably horizontal in order to make possible opening and closing of the die in a horizontal direction. The flow of molding material through the chute to the cylinder is preferably downward and gravitational. However, the chute must lie clear of the path of the plunger. The angular press arrangement best shown in Fig. 1, reconciles these various requirements, for the advantages of an upright cylinder and downward feed are retained, and at the same time the change in direction from the cylinder to the horizontal nozzle is not acute. It will be understood, however, that various other features of the present invention may be retained without necessarily employing the angular press arrangement herein shown.

It will be noted that the rack bar 124 is arranged at a slope parallel to that of the plunger and cylinder, thus permitting the movement of the plunger to be transferred directly to the rack bar. It will also be noted that the use of stop screw 144 provides an adjustment of the stroke of the rack bar relative to the stroke of the plunger and may also be used to partially or wholly compensate for lost motion of the plunger out of the cylinder, this lost motion being desirable to open the cylinder for the replenishment of molding material.

It is believed that the construction and operation of my improved molding apparatus, as well as the many advantages thereof, will be apparent from the foregoing detailed description. In operation, the die is closed and the extrusion plunger is forced downwardly, thereby forcing some of the molten or fused cellulose acetate from the cylinder through the nozzle into the die. The material during its passage through the constricted nozzle is brought to a uniformly mixed condition and uniform temperature and plasticity. The temperature of the heating jacket is maintained constant by automatic temperature control of the oil bath. The plunger is then retracted and the die opened to permit removal of the molded articles. The usual ejector mechanism on the die may be employed to free the molded article from the die. During the downward movement of the plunger the feed shroud 126 is moved by the sloping rack bar an amount depending upon the plunger movement, and this position of the shroud is maintained when the plunger is elevated. At any convenient time the operator pulls the feed bar 78 outwardly and then moves the same inwardly to initial position. During the outward movement the feed drum is rotated an amount determined by the position of the shroud and proportional to the preceding plunger movement. Upon initial movement of the rack bar the hopper door 100 is opened. At the end of the outward movement of the rack bar the holding dog 130 of the sloping rack bar is released, thus permitting the rack bar to move upwardly to initial position. Upon inward movement of the feed handle the hopper door is again closed. The modified form of the invention shown in Figs. 4 and 5 operates generally similarly, but manual movement is dispensed with.

My apparatus provides for successful and efficient continuous molding of articles out of thermoplastics even when relatively difficult to handle, as in the case of cellulose acetate. The apparatus permits of molding under high pressure, yet back-flow of material around the plunger is effectually prevented and no destructive wear or scoring of the cylinder and plunger takes place. Different materials may be mixed in desired proportion in the hopper, the hopper being divided into compartments, if desired, intended for loading with materials of different color or different character: for example, one compartment may be filled with diced laminated material and another with granular material. The compartments are movable and removable. The molding material is conveniently fed to the extrusion cylinder, and the amount of feed is automatically proportioned to the rate of consumption. This is true even when manual feed is preferred for convenience, and in such case the manual movement may be a full stroke not requiring active attention on the part of the operator for proportioning of the amount of material. The material is heated to a uniform temperature in the extrusion cylinder, and in any case is brought to a uniform condition of mixture, temperature and plasticity in a heated constricted nozzle before entering the mold. The mold may be separated in a horizontal direction, if preferred, while maintaining the advantages of a generally upright extrusion cylinder and a substantially downward feed of molding material.

It will be apparent that while I have shown and described the apparatus of my invention in preferred forms, many changes and modifications may be made in the structures disclosed without departing from the spirit of the invention, defined in the following claims.

I claim:

1. Apparatus for molding thermoplastic material comprising a die, a heating and extrusion cylinder, a plunger movable into and out of said cylinder, a hopper carrying a supply of the molding material, means to transfer a measured quantity of the material from the hopper to the cylinder, and means to maintain said transferred quantity of material constantly in proportion to the rate of use of material by the apparatus.

2. Apparatus for molding thermoplastic material comprising a die, a heating and extrusion cylinder, a plunger movable into and out of said cylinder, a hopper carrying a supply of the molding material, means to transfer a quantity of the material from the hopper to the cylinder, and means to automatically determine the amount of material transferred to the cylinder in dependence upon the lengths of the strokes of the plunger.

3. Apparatus for molding thermoplastic material comprising a die, a heating and extrusion cylinder, means to heat the cylinder to a constant temperature, a plunger movable into and out of said cylinder, a hopper adapted to carry a supply of the thermoplastic material, means to transfer a quantity of the material from the hopper to the cylinder after each stroke of the plunger, and means to automatically determine the amount of material transferred to the cylinder in proportion to the amount of material forced from the cylinder in the preceding stroke of the plunger.

4. Apparatus for molding thermoplastic material comprising a die, a heating and extrusion cylinder, a plunger adapted to move into and out of the cylinder with a variable length stroke, a hopper carrying a supply of molding material, a feeding device for delivering molding material from said hopper to said cylinder including a measuring device, connections between the measuring device and the plunger for controlling the quantity of moldable material measured out by the measuring device by the stroke of the plunger, and means for guiding the measured material to the said cylinder.

5. Apparatus for molding thermoplastic material comprising a die, a heating and extrusion cylinder, a plunger movable into and out of said cylinder, a hopper carrying a supply of the molding material, means to transfer a measured quantity of the material from the hopper to the cylinder including a drum rotatable at the bottom of the hopper to deliver material from the hopper, and a door at the lower edge of the hopper, means for guiding the material from the drum to the cylinder, means to rotate the drum, and means to open the door during movement of the drum.

6. Apparatus for molding thermoplastic material comprising a die, a heating and extrusion cylinder, a plunger movable into and out of said cylinder, a hopper carrying a supply of the thermoplastic material, means to transfer a measured quantity of the material from the hopper to the cylinder including a drum rotatable at the bottom of the hopper to deliver material from the hopper, a chute for guiding the material from the drum to the cylinder, and means to rotate the drum an amount proportional to the stroke of the plunger during the preceding molding operation.

7. Apparatus for molding thermoplastic material comprising a die, a heating and extrusion cylinder, a plunger adapted to move into and out of the cylinder with a variable length stroke, a hopper carrying a supply of molding material, a feeding device for delivering molding material from said hopper to said cylinder including a measuring device, connections between the measuring device and the plunger for controlling the quantity of moldable material measured out by the measuring device by the stroke of the plunger, a means for guiding the measured material to the said cylinder, and a manually operable device connected to the feeding device for delivering a measured quantity of moldable material to the guiding means.

8. Apparatus for molding thermoplastic material comprising a die, a heating and extrusion cylinder in flow communication therewith, a plunger movable into and out of the cylinder, means to heat the material in the cylinder, a hopper carrying a supply of the molding material, a feed drum at the bottom of the hopper, manually operated means for rotating the feed drum, and means to automatically limit the feed movement to an amount dependent upon the rate of use of material by the apparatus.

9. Apparatus for molding cellulose acetate comprising a die, a heating and extrusion cylinder in flow communication therewith, a plunger movable into and out of the cylinder, means to heat the material in the cylinder, a hopper carrying a supply of the molding material, a feed drum at the bottom of the hopper, manually operated means for rotating the feed drum, and means automatically operated by the plunger for making the manually operable means effective to only a limited extent dependent upon the stroke of the plunger during the preceding molding operation.

10. Molding apparatus for molding thermoplastic material comprising a die, a heating and extrusion cylinder in flow communication with the die, a plunger movable into the cylinder to force material from the cylinder into the die, means to heat the cylinder in order to fuse the material therein, and means to cool the open end of the cylinder to prevent back-flow around the plunger.

11. Molding apparatus for molding cellulose acetate comprising a die, a heating and extrusion cylinder in flow communication with the die, a plunger movable into the cylinder to force material from the cylinder into the die, means to heat the cylinder in order to fuse the material therein, means to feed solid cellulose acetate to the open end of the cylinder, and means to cool the open end of the cylinder to prevent back-flow around the plunger.

12. Apparatus for molding cellulose acetate comprising a die, a heating and extrusion cylinder in flow communication therewith, a plunger movable into and out of the cylinder and adapted to have varying length strokes, means to heat the material in the cylinder, a hopper carrying a supply of the molding material including an opening, a door for closing said opening, a feed drum adjacent said door, means for rotating said feed drum to deliver molding material to the cylinder, and means for controlling the quantity of material fed by the feeding drum interconnected to the plunger whereby the length of stroke of the plunger may predetermine the charge of molding material delivered to the cylinder.

13. Apparatus for molding thermoplastic material comprising a die, a heating and extrusion cylinder in flow communication therewith, a plunger movable into and out of the cylinder, means to heat the material in the cylinder, a hopper carrying a supply of the molding material, a feed drum at the bottom of the hopper, and means for automatically transferring from the hopper an amount of material dependent upon the stroke of the plunger during the preceding molding operation, in order to replenish the material in the cylinder.

14. Apparatus for molding cellulose acetate comprising a die, a heating and extrusion cylinder in flow communication therewith, a plunger movable into and out of the cylinder, means to heat the material in the cylinder, a hopper carrying a supply of the molding material, a feed drum at the bottom of the hopper, and means for automatically rotating the feed drum subsequent to the stroke of the plunger an amount dependent upon the stroke of the plunger, in order to replenish the material in the cylinder preparatory to the next molding operation.

15. An apparatus for molding thermoplastic material comprising a die, a heating and extrusion cylinder in flow communication therewith, and a plunger movable into and out of the cylinder for forcing material from the cylinder into the die under high pressure, the end of said plunger being made of relatively soft metal, said metal being of sufficient softness to be expanded into contact with the cylinder walls when the plunger is brought into contact with material in the cylinder under high pressure.

16. Apparatus for molding cellulose acetate comprising a die, a heating and extrusion cylinder in flow communication therewith, and a plunger movable into and out of the cylinder for forcing material from the cylinder into the die under high pressure, the end of said plunger being provided with a cap made of a material comprising principally copper, said material being adapted to expand into contact with the cylinder walls by bringing the plunger into contact with material in the cylinder under high pressure.

CHARLES PACK.

DISCLAIMER 2,033,735.—*Charles Pack*, Forest Hills, N. Y. MOLDING APPARATUS. Patent dated March 10, 1936. Disclaimer filed February 25, 1939, by the assignee, *Tennessee Eastman Corporation;* the patentee, assenting.

Hereby enters this disclaimer to claim 1 of said Letters Patent.

[*Official Gazette March 28, 1939.*]